Figure 2:
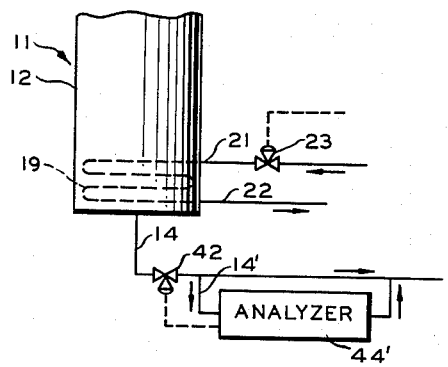

April 25, 1961

J. A. WEEDMAN 2,981,773

SEPARATION BY CRYSTALLIZATION

Filed March 1, 1954

INVENTOR.
J.A. WEEDMAN

BY *Hudson and Young*

ATTORNEYS

United States Patent Office 2,981,773
Patented Apr. 25, 1961

2,981,773
SEPARATION BY CRYSTALLIZATION

John A. Weedman, Bartlesville, Okla., assignor to Phillips Petroleum Company, a corporation of Delaware Filed Mar. 1, 1954, Ser. No. 413,372

2 Claims. (Cl. 260—707)

This invention relates to separation by partial crystallization. In one of its more specific aspects, the invention relates to improved apparatus for the separation of components of liquid mixtures by fractional crystallization. In another of its more specific aspects, the invention relates to an improved method for separating the components of liquid mixtures by fractional crystallization.

Separations of compounds may be effected by distillation, solvent extraction and crystallization. Although distillation and extraction are generally preferred because of economy and convenience of operation, there are some instances in which such processes cannot be successfully utilized. Many chemical isomers have similar boiling points and solubilities and cannot be separated satisfactorily by distillation or extraction. Separation by means of fractional crystallization can be satisfactorily utilized in making such separations. Fractional crystallization has one great advantage over other methods of separation, in that it is the only separation method which theoretically offers a pure product in a single stage of operation. Thus, whereas distillation and extraction theoretically require infinite stages for a pure product, crystallization in many cases requires only one. This is because of phase equilibrium in distillation and extraction, while by crystallization, substantially pure crystals can be separated from many solutions in one stage, regardless of the liquid composition, the only impurity being occluded mother liquor within the crystal interstices. Thus, whereas separation by distillation and extraction becomes more difficult as the purity of the product increases, separation by crystallization becomes easier.

Crystallization is thus well suited, not only to the separation of many chemical isomers which can be separated by no other means, but also to the purification of many compounds which cannot be economically purified by other means. Whereas one stage of crystallization theoretically offers a pure product, attainment of this ideal stage has been difficult. Complete removal of occluded impurities without substantial loss in yield is required. This invention results in a very close approach to the ideal crystallization stage.

Separation of relatively pure components from liquid mixtures may be effected by chemical methods or by either fractional distillation or fractional crystallization. Fractional distillation is frequently utilized where boiling points are sufficiently separated, but where the components of the system to be separated have relatively close boiling points, fractional crystallization is more suitable. A method of separating a pure component from a liquid mixture has been devised whereby the liquid mixture to be separated is introduced into a chilling zone wherein a slurry of crystals is formed and that slurry of crystals is then introduced into an elongated purification column in which the crystals are compacted so as to separate the major portion of mother liquor therefrom. The mass of compacted crystals is then moved through the column to a melting zone wherein the crystals are melted and a portion of the melt is caused to move countercurrently through at least a portion of the crystal mass so as to displace occluded impurities from the crystal mass approaching the melting zone. The exact mechanism whereby this displaced melt improves the purity of the final product is not completely understood. However, it is presently believed that the substantially pure material which is refluxed through at least a portion of the crystal mass displaces the mother liquor from the crystal mass approaching the melting zone and replaces the mother liquor in the interstices of the crystal mass. Thus, the portion of the crystal mass which approaches the melting zone does not contain any appreciable amount of impurities and the resulting product which is removed from the melting zone is of extremely high purity.

The operation of this type of a crystal purification system has proved to be commercially practical in the production of a product which has 98+ percent purity and, in some cases, even as high as 99.9 percent purity with high continuous yields. The process is applicable to multicomponent liquid organic mixtures which are eutectic-forming.

The following objects will be attained by the various aspects of the invention.

An object of the invention is to provide improved apparatus for the separation of a pure component from liquid mixtures. Another object of the invention is to provide an improved process for the separation of a pure component from a liquid mixture. Another object of the invention is to provide an improved method for continuously controlling the rate of high purity product withdrawal from a separation system. Another object of the invention is to provide an improved apparatus for continuously controlling the rate of high purity product withdrawal from a separation system. Another object of the invention is to provide means for controlling the heat input into the melt zone of a crystal purification column. Another object of the invention is to provide an improved process for controlling the introduction of heat into the melt zone of a crystal purification column. Other and further objects of the invention will be apparent to those skilled in the art upon study of the accompanying disclosure.

Broadly speaking, this invention resides in the continuous control of rate of product withdrawal from the purification tube so as to obtain a product of desired high purity. This control is accomplished in response to an analysis of the purity of product by means of an analyzer, such as a refractometer, a gravitometer, an infra-red analyzer, or a mass spectrometer. Unlike fractionation systems in which there can be a considerable variation from a predetermined pressure in the system, it is necessary to control the pressure in the melting zone of the purification tube in order to obtain a product of high purity in high yields. The invention further resides in a control of the heat input into the melt zone of the purification tube in response to a liquid level in a feed surge tank which feeds the liquid mixture to be separated into a chiller in which one of the components is crystallized to form a crystal slurry. Heat is supplied to the melt zone in response to the demands of the system. Thus, if the composition, at constant flow rate, changes so that a greater amount of crystal forming material is present and the rate of flow of crystals through the purification column remains constant as a result of constant heat input into the melt zone, the increased accumulation of crystals in the chiller will result in a rise in the liquid level of the feed surge tank causing the liquid level controller to act on the control of heat input into the melt zone so as to melt crystals at an increased rate. A reduction in concentration of crystal forming material in the feed, at constant flow rate will, conversely, lower the liquid level in the feed surge tank and cause a reduction of heat input into the melt zone. Variations in feed rate, at constant composition, will result in similar variations in the heat input into the heat zone because this feature of the invention controls the amount of heat supplied to the melt zone in response to the amount of crystals supplied to the purification column.

This invention is applicable to the separation of liquid mixtures, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, such as 97 or 98 percent, or where the concentrations of the components are about equal. One particular advantageous application of the process lies in the purification of a component of, say, 50 to 60 percent purity, so as to effect a purity upwards of 98 percent. In order to illustrate some of the systems to which the invention is applicable, the following compounds are grouped with respect to their close boiling points:

|  | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS$_2$ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-Cymene | 176.0 | −73.5 |

Systems consisting of any combination of two or more of the components within any one of the groups may be separated by the process of the invention, as well as systems made up of components selected from different groups; for example, benzene may be separated from a benzene-n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

Figure 1:
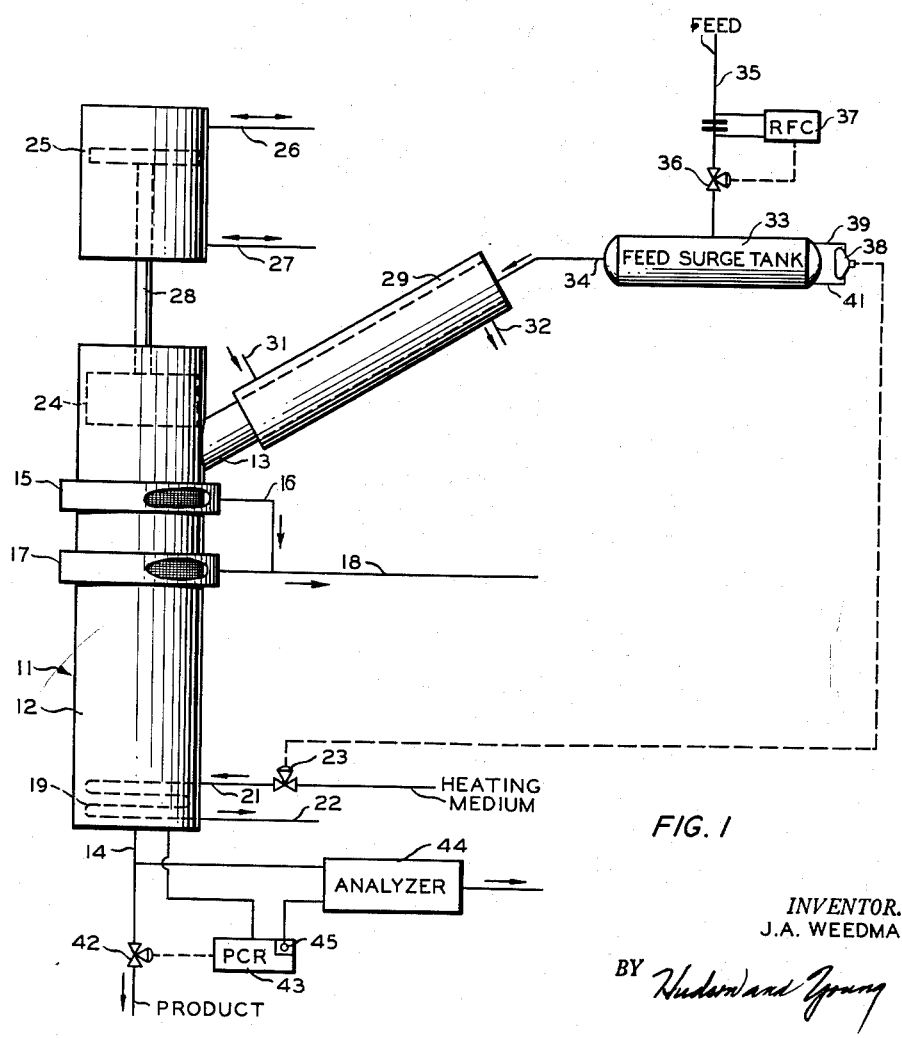

A more complete understanding of this invention will be obtained on study of the accompanying drawings in which Figure 1 is a schematic representation of the purification system of this invention.

Figure 2 is a section view of a modified system of this invention.

Referring to Figure 1 of the drawing, purification tube 11 comprises an elongated shell 12, preferably in an upright position, which is provided with a slurry inlet 13 in one end portion thereof and a product outlet 14 in the opposite end portion thereof. A filter 15 is provided in shell 12 immediately downstream of slurry inlet 13 for the removal of mother liquor, which is removed through conduit 16. When desired, a second filter 17 is provided in shell 12 downstream, with respect of filter 15, through which additional mother liquor is removed to conduit 18. The streams removed through filters 15 and 17 are very similar and, if desired, a single such filter may be used. A heater 19 is provided in the product removal end portion of the chamber formed within shell 12. For the purpose of illustration, the drawing is shown to indicate a system wherein heating medium is introduced into heater 19 through conduit 21 and removed through conduit 22. A flow control valve 23 is provided in conduit 21 so as to control the supply of heating medium to heater 19. It is within the scope of this invention to use other types of heaters than those which make use of heating fluids. Thus, an electrical heater can be used and conventional control means provided in the power input line to control the current supplied to the heater. A compacting member, such as piston 24, is provided in the upstream end portion of shell 12 and is driven by means of a motivating piston in chamber 25, the motivating piston being driven by the flow of motivating fluid through conduits 26 and 27. Other types of compacting means, such as augers, can be used if desired. The motivating force of the piston within chamber 25 is transmitted to piston 24 by means of piston rod 28.

A chiller 29, provided with conduits 31 and 32 for the inlet and outlet of cooling fluid, is connected to slurry inlet 13 of column 11. Chiller 29, which may be provided with a scraper, if desired, is connected at its upstream end to feed surge tank 33 by means of conduit 34. Feed conduit 35 is connected to feed surge tank 33 and is provided with a flow control valve 36 which is in turn connected to rate of flow controller 37, attached to conduit 35, upstream of valve 36. Liquid level controller 38 is connected to feed surge tank 33 by means of conduits 39 and 41. Liquid level controller 38 is operatively connected to flow control valve 23 in conduit 21 so as to supply heat to the melt zone in accordance with the level of liquid in surge tank 33, so as to supply a greater amount of heat and thus obtain more melting as the liquid level increases in said container and a lesser amount of heat so as to obtain less melting as the liquid level decreases.

Flow control valve 42 is provided in product outlet conduit 14 and is operatively connected to pressure controller recorder 43 which is in turn operatively connected to the outlet end portion of the chamber formed within shell 12. Analyzer 44, which may be a refractometer such as is described by Miller, Crawford and Simmons in Analytical Chemistry, vol. 24, No. 7, page 1087, is operatively connected to product outlet conduit 14 upstream of control valve 42 and is operatively connected to the reset mechanism 45 of pressure controller recorder 43. As pointed out above, analyzer 44 can be any analyzer which can be suitably adapted to the analysis of the product removed through conduit 14. Such devices are conventional and are available in the trade. Examples of such controllers include refractometers, gravitometers, infre-red analyzers, and mass spectrometers.

The device set forth in Figure 2 of the drawings is very similar to that shown in Figure 1. The lower portion of purification tube 12 is provided with a heater 19 and a product outlet 14. Product outlet 14 is provided with a flow control valve 42 which in this instance is connected directly to analyzer 44', which analyzer may be of the same type as analyzer 44, discussed in connection with Figure 1. Conduit 14' is connected to conduit 14 at its upstream and downstream ends and is further provided therein with analyzer 44' so that a sample stream which is withdrawn from conduit 14 is passed through analyzer 44' and is then returned to the product stream in conduit 14. Flow control valve 42 is then directly controlled in accordance with the purity of product as indicated by analyzer 44'. Flow control valve 42 is set at a time when the purity of product is that which is desired, and thereafter will be automatically controlled by analyzer 44' in accordance with the purity of product removed from purification tube 12.

In the operation of the process which is carried out in the system hereinbefore described, a liquid mixture is supplied to feed surge tank 33 at a predetermined rate controlled by rate of flow controller 37 through valve 36. The liquid mixture passes from feed surge tank 33 through conduit 34 to chiller 29. Although only a single chiller is diagrammatically shown in this drawing, it is within the scope of the invention to use a plurality of chillers to obtain the desired concentration of crystals in the resulting slurry. The resulting slurry is then introduced into purification tube 11 through inlet conduit 13 is permitted by the position of piston 24. The length of piston 24 is such that as it moves downstream in its stroke, the opening from inlet 13 is substantially closed until the piston is withdrawn in the completion of the stroke. As shown in this diagrammatic drawing, mother liquor is removed from the crystal mass, which is compacted by piston 24, through filter 15 and liquid outlet conduit 16. It is also within the scope of this invention to utilize a porous piston as the compacting member and to remove mother liquor from a point upstream of piston 24 in tube 11.

The crystal mass is moved in a downstream direction through purification tube 11 and is brought into contact with heater 19, through which heat is applied in sufficient quantity to continuously melt a portion of the crystal mass. A portion of the melt is forced upsteam through at least a portion of the crystal mass by means of the compacting force driving the crystal mass toward the heater. Pure product is removed from the purification tube 11 through outlet conduit 14 at a rate sufficient to result in predetermined purity of product. As shown in Figure 1, pressure from the melt zone at the outlet end of purification tube 11 is transmitted to pressure control recorder 43 which is set at a pressure which results in the desired purity of product. This pressure control recorder is operatively connected to flow control valve 42 so as to control product flow through valve 42 in the manner necessary to maintain the predetermined pressure of the liquid in the downstream end of purification tube 11.

The purity of the product which is obtained through conduit 14 depends upon the amount of melt which is forced upstream through at least a portion of the crystal mass. The amount of the melt which is forced upstream through the crystal mass is determined by the pressure prevailing in the melting zone and the resistance of the crystal mass to fluid flow therethrough (pressure drop through the crystal mass). That pressure is best controlled by control of the rate of product withdrawal through conduit 14. Pressure controller recorder is set when the purity of the product, as indicated by analyzer 44, is the purity desired. The purity of the product withdrawn through conduit 14 is thereafter analyzed in analyzer 44 and as the purity drops below a predetermined minimum, analyzer 44 operates to reset pressure controller recorder 43 through reset mechanism 45 in order to increase the pressure in the downstream end of purification tube 11 from 1 to 2 pounds. When the purity of the product removed through conduit 14 rises above a predetermined maximum, analyzer 44 operates to reset pressure controller recorder 43 through reset mechanism 45 so as to increase the volume of product which is permitted to be removed from purification tube 11 and thus decrease the pressure, generally 1 to 2 pounds, in the downstream end of purification tube 11. It is very desirable to operate the purification tube at a minimum pressure necessary to make the desired purity product since additional pressure results in a higher reflux than is needed. High reflux volume results in freezing of the reflux to form an impervious mass, or results in channeling of the crystal plug. This operation is in direct contrast to the operation of a fractionator in which it is possible to increase the reflux more than is needed for the desired purity without causing the fractionation column to be materially upset. Liquid which is displaced from the crystal mass by the melted product is removed through recycle filter 17 and may be recycled to a primary concentration step or may be reused in some other manner.

Better understanding of this invention will be obtained on consideration of the following specific example. This example is provided for the purpose of illustration and should not be utilized to unduly limit the invention.

*Example*

A vertical purification tube consisting of a tube 8 inches in diameter and 15 inches in length is provided with a reciprocating piston in its upper end portion. Feed inlet 13 is positioned in the upper portion of the purification tube and product outlet conduit 14 is provided in the lower end of that tube. A heater 19 is provided in the downstream end of the purification tube. A feed having the following composition is supplied to chiller 29, which is maintained at a temperature of −15° F. and a pressure of 5 p.s.i.g.

| | Percent |
|---|---|
| Toluene | 1.56 |
| Ethyl benzene | 12.76 |
| Ortho-xylene | 7.80 |
| Meta-xylene | 15.08 |
| Para-xylene | 62.80 |

The resulting slurry is introduced into purification tube 11 at −12° F. Piston 24 is operated on a cycle of 3 minutes and 45 seconds per stroke with a hydraulic pressure of 200 p.s.i.g. Mother liquor having the following composition is removed through filter 15 and conduit 16.

| | Percent |
|---|---|
| Toluene | 2.1 |
| Ethyl benzene | 18.9 |
| Ortho-xylene | 17.3 |
| Meta-xylene | 28 |
| Para-xylene | 33.7 |

Heat is supplied to the downstream end of purification tube 11 so as to raise the temperature of the melt to 100° F. Product withdrawal is controlled so as to maintain a pressure in the melting zone of purification tube 11 of 55 p.s.i.g. during the downstroke of piston 24. Sufficient melt is forced into the crystal mass to give a product of 99.1 percent para-xylene, at an average rate of 23 gallons per hour. The liquid material which is removed through filter 17 and conduit 18 has the following composition.

| | Percent |
|---|---|
| Toluene | 2.0 |
| Ethyl benzene | 18.8 |
| Ortho-xylene | 17.0 |
| Meta-xylene | 27.7 |
| Para-xylene | 34.5 |

It will be apparent to those skilled in the art that various modifications of this invention can be made upon study of the accompanying disclosure. Such modifications are believed to be clearly within the spirit and the scope of this invention.

I claim:

1. A process for the separation of one component from a liquid solution which comprises supplying said liquid solution to a container at a predetermined rate; passing said liquid solution to a cooling zone so as to convert a portion of said solution to crystals; passing a resulting mixture of said crystals and uncrystallized liquid into the inlet end portion of an elongated confined displacement zone; compressing said crystals into a compact mass in said displacement zone and forcing said compact mass of crystals through said displacement zone toward a melting zone; withdrawing liquid from said inlet end portion of said displacement zone; supplying heat to said melt zone in accordance with the level of liquid in said container so as to supply a greater amount of heat and thus obtain more melting as the liquid level increases in said container and a lesser amount of heat so as to obtain less melting as the liquid level decreases in said container; forcing a portion of said melt countercurrently through said mass of crystals toward said inlet end at a superatmospheric pressure; withdrawing product from said melt zone; and controlling the rate of withdrawal of said product in accordance with the purity of said withdrawal product so as to withdraw only product having at least a predetermined minimum purity.

2. An apparatus for concentrating at least one component of a liquid which comprises a tube having a crystal slurry inlet in one end portion of said tube and a liquid product outlet in the other end portion of said tube and a mother liquor outlet intermediate said crystal slurry inlet and said product outlet; container means for said liquid containing said component to be concentrated; means for supplying liquid to said container means; means for withdrawing liquid from said container means to a means for chilling said liquid sufficiently so as to form crystals of at least one component contained therein; means for determining the liquid level in said container means; means for introducing a crystal slurry from said chilling means into said inlet; means to move crystals of said slurry through said tube as a compressed mass; heating means operatively connected to the outlet end portion of said tube; means operatively connecting said heating means and said means for determining the liquid level in said container means so as to increase the heat output of said heating means when the liquid level in the container means rises and to decrease the heat output of said heating means when the liquid level in said heating means decreases; product outlet means in the outlet end of said tube; flow control means in said product outlet means; a pressure controller operatively connected to the outlet end of said tube and to said flow control means; and an analyzer operatively connected to said product outlet means upstream of said flow control means and to said pressure control so as to reset said pressure control in response to product analysis.

References Cited in the file of this patent

UNITED STATES PATENTS

| 2,413,674 | Weir | Dec. 31, 1946 |
| 2,459,404 | Anderson | Jan. 18, 1949 |
| 2,617,274 | Schmidt | Nov. 11, 1952 |
| 2,683,178 | Findlay | July 6, 1954 |
| 2,750,433 | Le Tourneau et al. | June 12, 1956 |